United States Patent

Narayanan et al.

[11] 3,901,909
[45] Aug. 26, 1975

[54] MERCAPTOBENZIMIDAZOLYL UREAS AND THIOUREAS

[75] Inventors: Venkatachala Lakshmi Narayanan, Hightstown; Rudiger Dieter Haugwitz, Titusville, both of N.J.

[73] Assignee: E. R. Squibb & Sons, Inc., Princeton, N.J.

[22] Filed: Jan. 18, 1974

[21] Appl. No.: 434,714

Related U.S. Application Data

[63] Continuation-in-part of Ser. No. 312,004, Dec. 4, 1972, abandoned, which is a continuation-in-part of Ser. No. 136,197, April 21, 1971, Pat. No. 3,718,662.

[52] U.S. Cl. .............................................. 260/309.2
[51] Int. Cl.[2] ...................................... C07D 235/28
[58] Field of Search ................................. 260/309.2

[56] References Cited
UNITED STATES PATENTS
3,720,686  3/1973  Narayanan et al............... 260/309.2

Primary Examiner—Sherman D. Winters
Assistant Examiner—S. D. Winters
Attorney, Agent, or Firm—Lawrence S. Levinson; Merle J. Smith; Stephen B. Davis

[57] ABSTRACT

Mercaptobenzimidazolyl ureas and thioureas are provided having the structure

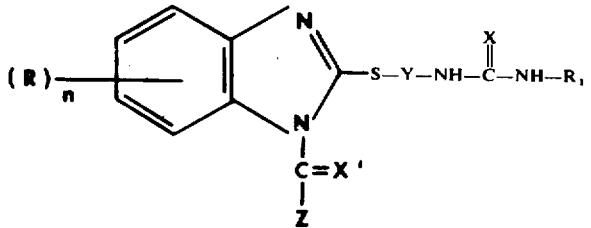

and which are useful as anthelmintic agents.

10 Claims, No Drawings

MERCAPTOBENZIMIDAZOLYL UREAS AND THIOUREAS

This application is a continuation-in-part of copending application Ser. No. 312,004, filed Dec. 4, 1972, now abandoned which in turn was a continuation-in-part of application Ser. No. 136,197 filed Apr. 21, 1971, now U.S. Pat. No. 3,718,662.

The present invention relates to mercaptobenzimidazolyl ureas and thioureas having the structure

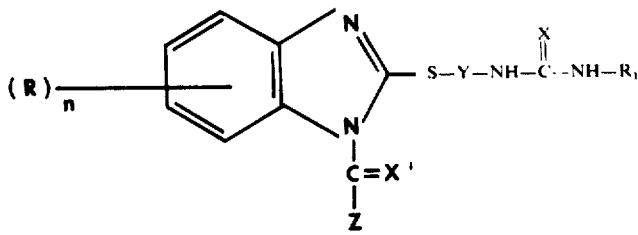

wherein X is oxygen or sulfur, R is hydrogen, lower alkyl, aryl, aralkyl, lower alkoxy, aroyl, substituted aryl, lower alkylthio, acyl, trifluoromethyl, nitro, halogen, cyano, thiocyanato, amido, substituted amino, dialkylaminoalkyl, alkyloxy- or aryloxycarbonyl

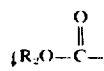

wherein $R_2$ can be lower alkyl, lower alkylaryl) or carbamate ester (—NHCOOR$_3$ wherein $R_3$ is lower alkyl, aryl, substituted aryl or cycloalkyl, $R_1$ is aryl, substituted aryl, cycloalkyl, lower alkyl, acyl or aroyl, Z is lower alkyl, aryl, lower alkoxy, aryloxy, lower alkylamino, cycloalkylamino of 3 to 7 carbons, acyl amino, or aryl amino, Y is a straight chain alkylene group of from one to six carbon atoms which may or may not be substituted by one or two alkyl groups of from one to four carbon atoms, n is 0, 1 or 2, and X' is oxygen when Z is lower alkoxy, aryloxy, aryl, or lower alkyl and is either oxygen or sulfur when Z is lower alkylamino, cycloalkylamino, acyl amino, or aryl amino.

The lower alkyl groups set forth above include straight or branched chain aliphatic hydrocarbon radicals having up to and including seven carbon atoms, such as methyl, ethyl, propyl, isopropyl, butyl, s-butyl, isobutyl, t-butyl, amyl, hexyl, heptyl, and the like.

The alkylene group represents a divalent straight or branched chain aliphatic hydrocarbon and can contain from one to six carbon atoms in a chain with or without side chains. The side chains are generally from one to four carbon atoms which may also be straight or branched. The side chains can include cycloalkyl substituents. Examples of these groups include groups corresponding to the above alkyl groups as well as 3-(cyclobutyl)butylene, 2-ethylpropylene, butylene and 2-cyclopropylhexylene.

The lower alkoxy group and the alkoxy portion of the alkoxycarbonyl group include straight and branched chain radicals of up to and including seven carbon atoms, corresponding to the above alkyl groups, e.g., methoxy, ethoxy, propoxy, isopropoxy, and the like. The aryloxy portion of the aryloxycarbonyl group includes any of the aryl groups set out below.

The cycloalkyl groups can have from three to about seven carbon atoms and include, for example, cyclopropyl, cyclopentyl and cycloheptyl.

The term "halogen" includes each of the four halogens, but fluorine and chlorine are preferred.

The substituted amino groups include mono- or di-lower alkyl- or arylamino where lower alkyl and aryl are as defined herein, such as methylamino, ethylamino, isopropylamino, heptylamino, dimethylamino, diethylamino, ethylmethylamino, butylmethylamino, ethyl i-propylamino, anilino, diphenylamino, napthylamino, or N-methyl-N-phenylamino and the like.

The term "aryl" includes monocyclic or bicyclic monovalent aromatic ring systems such as phenyl or naphthyl. These aryl radicals can include as substituents halogen, nitro or any of the alkyl groups mentioned hereinbefore.

The acyl and aroyl groups included herein are derived from hydrocarbon carboxylic acids of less than twelve carbon atoms, which may be exemplified by the lower alkanoic acids (e.g., formic, acetic, propionic, butyric, valeric), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl)-pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene)-pentenoic acid], and the like.

Preferred embodiments of this invention are as follows:

R is hydrogen, lower alkyl, lower alkoxy, lower alkylthio, trifluoromethyl, nitro, halogen, lower alkylamino or di-lower alkylamino.

n is zero or one.

$R_1$ is phenyl, substituted phenyl, cycloalkyl, or lower alkyl.

Z is lower alkoxy, phenoxy, substituted phenoxy, lower alkylamino, cycloalkylamino of three to seven carbons, anilino, or substituted anilino.

The most preferred embodiments are as follows:

R is hydrogen or nitro.

$R_1$ is phenyl, p-nitro-phenyl, or cyclohexyl.

Z is lower alkylamino, cycloalkylamino of three to seven carbons, anilino, or substituted anilino, especially cyclohexylamino.

Y is —(CH$_2$)$_3$—.

Examples of compounds falling within the present invention include, but are not limited to, the following set out in Table A below.

TABLE A

| R(position) | n | Z | X' | Y | X | R₁ |
|---|---|---|---|---|---|---|
| H | — | CH₃ | O | —(CH₂)₃— | S | C₆H₅ |
| H | — | C₂H₅ | O | —(CH₂)₃— | S | p—NO₂—C₆H₄— |
| 5—NO₂ | 1 | (S) thiophene | O | —(CH₂)₃— | S | C₆H₅ |
| 5—NO₂ | 1 | (S)-phenyl-NH— | O | —(CH₂)₃— | O | (S) thiophene |
| 5—C₄H₉ | 2 | C₆H₅NH | O | —CH₂—CH(CH₃)— | O | C₃H₇ |
| 6—C₄H₉ | | | | | | |
| 5—C₆H₅ | 1 | p—CH₃—C₆H₄NH | S | —(CH₂)₅— | O | C₆H₅C(=O) |
| 4—CH₃O | 1 | CH₃NH | S | —CH₂—C(CH₃)(H)—CH₂— | S | C₆H₅C(=O) |
| 5,6—di—Cl | 2 | C₄H₉ | O | —(CH₂)₅— | O | o-CH₃-C₆H₄ |
| 6—C₂H₅S— | 1 | C₆H₅O | O | —(CH₂)₃— | S | (S) thiophene-CH₃ |
| 4—(CH₃)₂N— | 1 | C₂H₅O | O | —(CH₂)₂—C(CH₃)(C₂H₅)— | O | C₂H₅ |
| 6—(C₂H₅)(CH₃)N—C₂H₄— | 1 | C₆H₅—NH | O | —CH₂CH(C₃H₇)— | S | C₆H₅ |
| 7—CN | 1 | C₃H₇—NH | S | —(CH₂)₃— | O | (S) thiophene-CH₃ |
| 6—CH₃OC(=O) | 1 | p—Cl—C₆H₄—NH | O | —(CH₂)₅— | S | CH₃—C(=O) |
| 5—C₄H₉C | 1 | C₆H₅NH | S | —(CH₂)₆— | O | C₆H₅ |
| 5—NCS— | 1 | C₆H₅NH | S | —CH₂— | S | C₅H₁₁ |
| 5—CH₃OC(=O)NH— | 1 | C₂H₅ | O | —(CH₂)₄— | O | (S) thiophene |
| 6—C₆H₅C(=O) | 1 | C₆H₅ | O | —CH₂— | S | C₄H₉ |
| 5—CH₃C(=O)NH— | 1 | C₃H₇ | O | —CH₂— | O | C₆H₅ |
| 5,6—di—Br | 2 | (S) thiophene-NH | S | —(CH₂)₄— | O | p—nitro—C₆H₄ |
| 4—C₂H₅O | 1 | p—NO₂—C₆H₄O | O | —(CH₂)₃— | S | C₆H₅ |
| H | — | p—Cl—C₆H₄O | O | —(CH₂)₃— | O | (S) thiophene-CH₃ |

Compounds of Formula I can be prepared by reacting a mercaptobenzimidazole of the structure

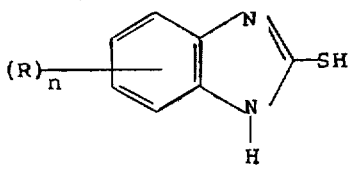

II with a haloalkylamine hydrobromide of the structure
$$A - Y - NH_2 \cdot HBr \quad \text{III}$$
wherein A is Br or Cl, employing a molar ratio of II:III of within the range of from about 1.5:1 to about 1:1 and preferably 1:1 to form an aminoalkylthiobenzimidazole of the structure

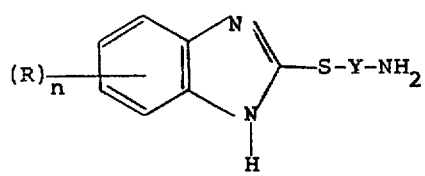

IV

The reaction of II and III is carried out in protic or aprotic solvents such as alkanols of up to nine carbon atoms, acetone, benzene and tetrahydrofuran employing temperatures of within the range of from about 60° to about 150°C and preferably from about 70° to about 100°C, for periods ranging from 30 minutes to about 24 hours and preferably from about 30 minutes to about 10 hours.

Compound IV can then be reacted with an isocyanate or isothiocyanate of the structure

V to form compounds of Formula VI. This reaction is carried out at a temperature ranging from about 0° to about 140°C and preferably from about 20° to about 90°C, for periods ranging from about 30 minutes to about 24 hours and preferably from about 30 minutes to about 12 hours in the presence of solvents such as alkanols of up to nine carbon atoms, esters such as ethyl acetate, ethers such as tetrahydrofuran, ketones such as ethylmethyl ketone and aromatic hydrocarbons such as benzene, toluene and xylene. Compound IV is reacted in a molar ratio to compound V (IV:V) of within the range of from about 1.5:1 to about 1:1, preferably 1:1.

Compounds of Formula I where

is carbamoyl or thiocarbamoyl

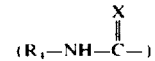

are prepared by reacting a compound of the formula:

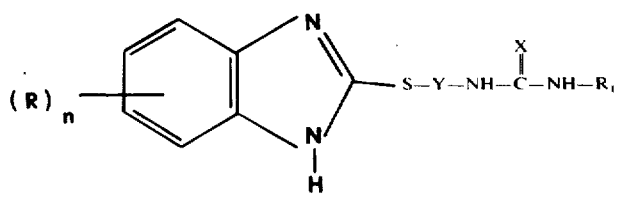

VI with an isocyanate or isothiocyanate of the structure

VII where $R_1$ is acyl, lower alkyl, cycloalkyl of three to seven carbons, or aryl. Where

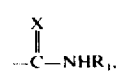

is the same as

a molar ratio of VI:VII within the range of from about 1:1 to about 1:50 and preferably from about 1:2 to about 1:5 is utilized. Such compounds (i.e., where

is the same as

are preferably prepared by reacting a compound of the structure IV with an excess of isocyanate or isothiocyanate VII. Where is other than 

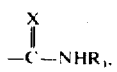

a molar ratio of VI:VII of from about 1:1 to about 1:50 and preferably about 1:1 is employed. Any of the solvents mentioned above with respect to the reaction of compounds IV and V can be employed. The reaction of VI and VII is carried out at a temperature within the range of from about 0° to about 140°C and preferably from about 20° to about 90°C for periods ranging from about 30 minutes to about 24 hours and preferably from about 30 minutes to about 12 hours.

Compounds of Formula I where

is alkoxycarbonyl, aryloxycarbonyl, acyl or aroyl can be prepared by reacting compound VI with a halide of the structure

 VIII where

is alkoxycarbonyl, aryloxycarbonyl, acyl or aroyl, in the presence of a basic catalyst, such as triethylamine, N,N-dimethylaniline or N-ethylpiperidine in the presence of a solvent such as employed in the reaction of compounds IV and V. A molar ratio of VI:VIII within the range of from about 1:1 to about 1:100 and preferably from about 1:1 to about 1:20 is employed. The reaction is carried out at a temperature within the range of from about 15° to about 120°C and preferably from about 20° to about 80°C for periods ranging from about 5 minutes to about 8 hours and preferably from about 10 minutes to about 6 hours.

The mercaptobenzimidazole II starting material can be prepared by reacting an o-phenylenediamine

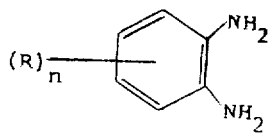

with, for example, potassium ethyl xanthate in accordance with the procedure described in "Organic Synthesis" Col. Vol. IV, page 569 to form the mercaptobenzimidazole II

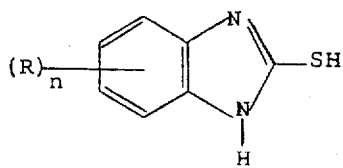

Examples of suitable starting o-phenylenediamines II are set out in Table B below.

TABLE B

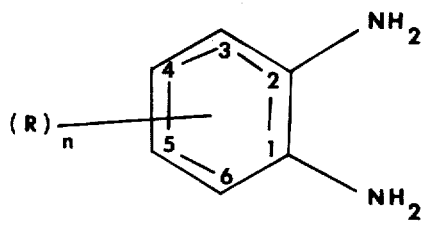

| | R (position) | n |
|---|---|---|
| 1. | H | — |
| 2. | $C_6H_5\overset{O}{\underset{\|}{C}}$— (4) | 1 |
| 3. | $C_2H_5\overset{O}{\underset{\|}{C}}NH$— (4) | 1 |
| 4. | $C_2H_5O$— (5) | 1 |
| 5. | Br (5) | 2 |
|  | Br (6) |  |
| 6. | $CH_3NH$— (6) | 1 |
| 7. | $(C_2H_5)_2N$— (4) | 1 |
| 8. | $(C_2H_5)_2NCH_2$— (5) | 1 |
| 9. | $C_6H_5O\overset{O}{\underset{\|}{C}}$— (4) | 1 |
| 10. | $CF_3$ | 1 |
| 11. | $CH_3S$ (3) | 2 |
|  | $C_2H_5$ (5) |  |
| 12. | $C_6H_5$ (5) | 1 |
| 13. | $NO_2$ (5) | 1 |
| 14. | —SCN (6) | 1 |
| 15. | Cl (4) | 2 |
|  | $CH_3$ (5) |  |
| 16. | $C_6H_5CH_2$— (4) | 1 |
| 17. | —CN (5) | 1 |
| 18. | $C_6H_5$ (3) | 1 |
| 19. | $CH_3$—$C_6H_4$— (4) | 1 |
| 20. | $C_2H_5\overset{O}{\underset{\|}{C}}$ (4) | 1 |
| 21. | —NHCOOC$_3$H$_7$ (5) | 1 |
| 22. | —NHCOOC$_6$H$_5$ (6) | 1 |
| 23. | —NHCOO—⟨S⟩ (7) | 1 |

Examples of suitable haloalkylamine hydrobromides III include, but are not limited to, the following:

$Br-CH_2-NH_2HBr$
$Br-(CH_2)_2-NH_2HBr$

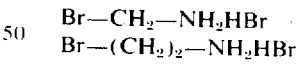

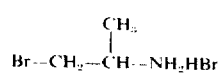

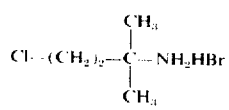

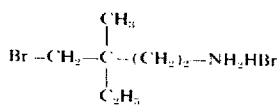

$Cl-(CH_2)_6-NH_2HBr$
$Br-(CH_2)_5-NH_2HBr$

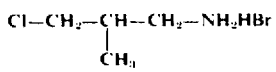

Examples of suitable isocyanates and isothiocyanates include, but are not limited to, the following:

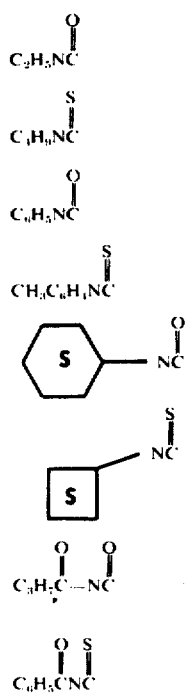

Examples of suitable halides of structure VIII include, but are not limited to, the following:

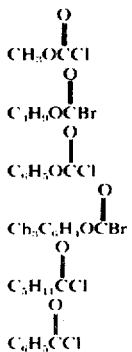

The mercaptobenzimidazolyl ureas and thioureas described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular mercaptobenzimidazolyl urea or thiourea being employed, on the severity of the infection and on the particular species of animal to be treated. In general, the mercaptobenzimidazolyl ureas and thioureas exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The mercaptobenzimidazolyl ureas and thioureas may be incorporated in the animal feeds, and this method of administration is preferred when the compounds are to be used prophylacetically, in which case they are incorporated in the feeds at concentrations such that the animal will consume daily from about 10 to about 70 mg. of mercaptobenzimidazolyl urea or thiourea per kilogram of body weight.

The means employed for administering these mercaptobenzimidazolyl ureas and thioureas to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

The following Examples further illustrate the invention.

EXAMPLE 1

1-[3-(2-Benzimidazolylthio)propyl]-3-phenyl-2-thiourea

A. 2-[(3-Aminopropyl)thio]benzimidazole, dihydrobromide

To a solution of 10 g of 2-mercaptobenzimidazole in 15 ml of ethyl alcohol, a solution of 15.1 g of 3-bromopropylamine hydrobromide in 60 ml of water is added and the mixture is refluxed for 3 hours. The solvent is evaporated in vacuo and the residue is crystallized from absolute alcohol to give 19.1 g (71%) of needles of the above title, m.p. 272°–274°.

Anal. Calcd. for $C_{10}H_{13}N_3S.2HBr$: C,32.54; H,3.55; N,11.39; Br,43.30. Found: C,32.31; H,3.86; N,11.20; Br,43.08. cB. 1-[(3-(2-Benzimidazolylthio)propyl]-3-phenyl-2-thiourea To a solution of 5.5 g (0.015 mole) of 2-[3-aminopropyl)-thio]benzimidazole, dihydrobromide in 50 ml of ethyl alcohol, alcoholic solution of potassium hydroxide is added until slightly basic. Phenyl isothiocyanate, 1.8 g (0.015 mole) is added and the reaction mixture is stirred and refluxed for 1 hour. At the end of this period, the solvent is evaporated in vacuo, and the residue crystallized from dilute methyl alcohol to give 3.0 g of the title compound, m.p. 161°–163°. Recrystallization from dilute methyl alcohol gives an analytical sample, m.p. 163°–165°.

Anal. Calcd. for $C_{17}H_{18}N_4O_2$: C,59.61; H,5.30; N,16.35. Found: C,59.63; H,5.13; N,16.08.

EXAMPLE 2

1-[3-(2-Benzimidazolylthio)propyl]-3-p-nitrophenyl-2-thiourea

Following the procedure of Example 1B, but substituting an equivalent amount of p-nitrophenyl isothiocyanate for phenyl isothiocyanate, there is obtained the title compound, m.p. 172°–173°.

Anal. Calcd. for $C_{17}H_{17}N_5O_2S_2$: C,52.69; H,4.42; N,18.08. Found: C,52.89; H,4.59; N,18.18.

EXAMPLE 3

1-[3-[(5-Nitro-2-benzimidazolyl)thio]propyl]-3-phenyl-2-thiourea

A. 5-Nitro-2-[(3-aminopropyl)thio]benzimidazole, dihydrobromide

Following the procedure of Example 1A, but substituting an equivalent amount of 5-nitro-2-mercaptobenzimidazole for 2-mercaptobenzimidazole, there is obtained 5-nitro-2-[(3-aminopropyl)thio]benzimidazole, dihydrobromide, m.p. 241°–242°.

Anal. Calcd. for $C_{10}H_{12}N_4O_2S \cdot 2HBr$: C,29.00; H,3.41; N,13.53. Found: C,28.84; H,3.43; N, N,13.40.

B.
1-[(3-[(5-Nitro-2-benzimidazolyl)thio]propyl]-3-phenyl-2-thiourea

Following the procedure of Example 1B, but substituting an equivalent amount of 5-nitro-2-[(3-aminopropyl)thio]-benzimidazole dihydrobromide for 2-[(3-aminopropyl)thio]-benzimidazole dihydrobromide, there is obtained the title compound, m.p. 153°–155°.

Anal. Calcd. for $C_{17}H_{17}N_5O_2S_2$: C,52.69; H,4.42; N,18.08. Found: C,52.68; H,4.58; N,17.76.

EXAMPLE 4

1-Cyclohexyl-3-[3-[[1-(cyclohexylcarbamoyl)-5-nitro-2-benzimidazolyl]thio]propyl]urea To a solution of 2.5 g (0.01 mole) of 5-nitro-2-[(3-aminopropyl)thio]benzimidazole in 50 ml of tetrahydrofuran, 2.5 g (0.02 mole) of cyclohexyl isocyanate is added, and the mixture refluxed for 0.5 hour. The solvent is evaporated in vacuo, and the residue is crystallized from absolute alcohol to give the title compound, m.p. 155°–156°.

Anal. Calcd. for $C_{24}H_{34}N_6O_4S$: C,57.35; H,6.80; N,16.72. Found: C,57.33; H,6.63; N,16.95.

EXAMPLES 5 to 22

Following the procedure of Example 1A except substituting the haloalkylamine hydrobromide shown in column A and the mercaptobenzimidazole shown in column B of Table I below the aminoalkylthiobenzimidazole shown in column C is formed; and then following the procedure of Example 1B substituting the aminoalkylthiobenzimidazole of column C and the isocyanate or isothiocyanate of column D the product shown in column E is formed.

TABLE I

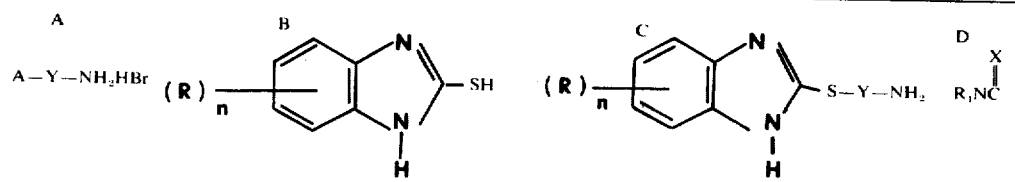

| Ex. No. | A | Y | n | R(position) | R | Y | $R_1$ | X |
|---|---|---|---|---|---|---|---|---|
| 5 | Cl | $-(CH_2)_2-$ | — | H | As in Column B | As in Column A | $C_6H_5$ | O |
| 6 | Br | $-(CH_2)_3-$ | 1 | $C_5H_{11}$ (5) | | | cyclohexyl | S |
| 7 | Br | $-(CH_2)_8-$ H | 1 | $C_6H_5$ (6) | | | $C_3H_7$ | S |
| 8 | Br | $-(CH_2)_3-C-$ $C_3H_7$ | 1 | $C_3H_7O$ (4) | | | $C_6H_5C$—O | O |
| 9 | Cl | $-(CH_2)_3-$ CH | 1 | $C_3H_7CNH-$ (5) O | | | $C_6H_5C$—O | S |
| 10 | Br | $-CH_2-C-$ $CH_3$ | 1 | CN (5) | | | $p-NO_2-C_6H_4-$ | O |
| 11 | Br | $-(CH_2)_2-C-(CH_2)_3-$ $CH_3$ | 1 | $CF_3$ (5) | | | $C_7H_{15}$ | O |
| 12 | Br | $-CH_2-$ | 1 | Cl (7) | | | thiophene | S |

TABLE 1—Continued

| A | B | C | D |
|---|---|---|---|
| A—Y—NH$_2$·HBr | (R)$_n$-benzimidazole-2-SH | (R)$_n$-benzimidazole-2-S—Y—NH$_2$ | $\overset{X}{\underset{\|}{R_1NC}}$ |

| Ex. No. | A | Y | n | R(position) | R | Y | R$_1$ | X |
|---|---|---|---|---|---|---|---|---|
| 13. | Cl | —CH$_2$—CH(C$_2$H$_5$)(C$_3$H$_7$)— | 1 | C$_6$H$_5$CO— | | | CH$_3$— | S |
| 14. | Br | —CH$_2$—CH(C$_3$H$_7$)— | 1 | C$_2$H$_5$S— (5) | | | [thietane-S] | S |
| 15. | Br | —CH(CH$_3$)—CH$_2$— | 1 | C$_4$H$_9$C(O) (6) | | | C$_5$H$_{11}$CO— | O |
| 16. | Br | —C(CH$_3$)$_2$—CH$_2$— | 1 | NO$_2$ (6) | | | CH$_3$ | S |
| 17. | Cl | —(CH$_2$)$_2$—CH(CH$_3$)— | 2 | —SCN (6), CH$_3$(5) | | | CH$_3$—C$_6$H$_4$— | O |
| 18. | Cl | —CH$_2$— | 1 | C$_6$H$_5$CNH— | | | [thiirane-S] | O |
| 19. | Br | —(CH$_2$)$_3$— | 1 | (CH$_3$)$_2$N— (6) | | | C$_2$H$_5$ | S |
| 20. | Br | —(CH$_2$)$_4$— | 1 | (C$_2$H$_5$)$_2$NCH$_2$— (5) | | | C$_4$H$_9$ | S |
| 21. | Br | —(CH$_2$)$_2$— | 1 | CH$_3$OC— (5) | | | C$_3$H$_7$ | O |
| 22. | Br | —CH$_2$— | 1 | —NHCOOCH$_3$ (5) | | | CH$_3$ | S |

TABLE 1—Continued

E: (R)$_n$-benzimidazole-2-S—Y—NH—C(=X)NH—R$_1$

| n R | Y | R$_1$ X |
|---|---|---|
| As in Column B | As in Column A | As in Column D |

EXAMPLES 23 to 32

Following the procedure of Example 4 except substituting the benzimidazole products of Examples 1, 2 and 5 and 16 to 22 (column E of Table I) as shown in column A of Table II and the isocyanate or isothiocyanate shown in column B, the product shown in column C is obtained.

TABLE II

A: (R)$_n$-benzimidazole-2-S—Y—NH—C(=X)—NH—R$_1$
B: $\overset{X'}{\underset{\|}{ZC}}$
C: (R)$_n$-benzimidazole (with N—C(=X')—Z)-2-S—Y—NH—C(=X)—NH—R$_1$

| Ex. No. | n | R(position) | Y | X | R$_1$ | (Ex. No.) Z | X' | nRYXR$_1$ | $\overset{X'}{\underset{\|}{C-Z}}$ |
|---|---|---|---|---|---|---|---|---|---|
| 23. | | H | (CH$_2$)$_2$ | S | C$_2$H$_5$ | 1 CH$_3$NHO | | As in Column A | CH$_3$NHC(O)— |

TABLE II—Continued

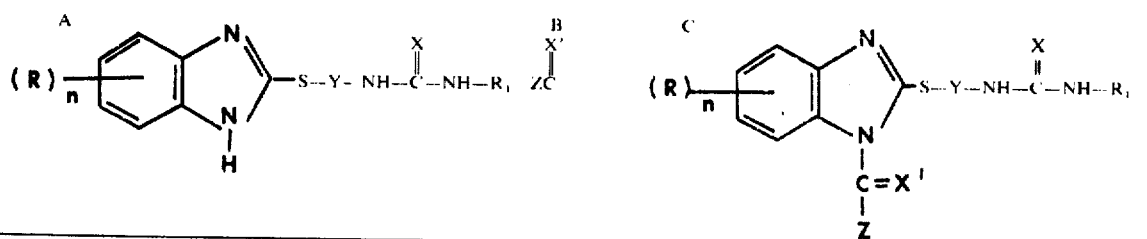

| Ex. No. | n | R(position) | Y | X | R₁ | (Ex. No.) | Z | X' | n R Y X R₁ $\overset{X'}{\underset{}{C}}$—Z |
|---|---|---|---|---|---|---|---|---|---|
| 4. | — | H | (CH₂)₃ | S | p—NO₂—C₆H₄— | 2 | [S with NH] | O | [S]—NHC(=O)— |
| 5. | — | H | (CH₂)₂— | O | C₆H₁₃— | 5 | C₆H₁₃—NH | O | C₆H₁₃NHC(=O)— |
| 6. | 2 | NO₂(6), NO₂(7) | —C(CH₃)₂—CH₂— | S | CH₃ | 16 | C₆H₅CH₂NH | S | C₆H₅CH₂NHC(=S)— |
| 7. | 2 | —SCN(6), CH₃(5) | —(CH₂)₂—CH(CH₃)— | O | C₆H₅C(=O) | 17 | C₆H₅C(=O)NH | S | C₆H₅C(=O)NHC(=S)— |
| 8. | 1 | C₆H₅C(=O)NH—(7) | —CH₂— | O | [cyclopropyl-S triangle] | 18 | C₆H₉C(=O)NH | S | C₆H₉C(=O)NHC(=S)— |
| 9. | 1 | (CH₃)₂N(6) | —(CH₂)₂— | S | C₂H₅ | 19 | C₆H₅C(=O)—NH | S | C₆H₅C(=O)NHC(=S)— |
| 10. | 1 | (C₂H₅)₂NCH₂(5) | —(CH₂)₃— | S | C₃H₇ | 20 | p—NO₂—C₆H₄NH | S | p—NO₂—C₆H₄—NHC(=S)— |
| 11. | 1 | CH₃OC(=O)(5) | —(CH₂)₂— | O | C₆H₅ | 21 | C₆H₅NH | S | C₆H₅—NHC(=S)— |
| 12. | 1 | —NHCOOCH₃(5) | —CH₂— | S | CH₃ | 22 | [S-cyclohexyl]—NH | O | [S-cyclohexyl]—NHC(=O)— |

EXAMPLE 33

[3-[1-Acetyl-5-Nitro-2-benzimidazolyl)thio]propyl]-3-phenyl-2-thiourea

To a solution of 3.8 g (0.01 mole) of 1-[3-[(5-nitrobenzimidazolyl)thio]propyl]-3-phenyl-2-thiourea in 10 ml of tetrahydrofuran, a solution of 0.80 g of acetyl chloride in 10 ml of tetrahydrofuran is added followed by the addition of 1.1 ml of triethylamine. The mixture is refluxed for 0.5 hour on a steam bath. The solvent is removed in vacuo and the product crystallized from alcohol.

EXAMPLES 34 to 43

Following the procedure of Example 33 except substituting the benzimidazole product of Examples 1, 2 and 5 and 16 to 22 (column E of Table I) as shown in column A of Table III and the

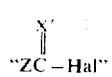

"ZC—Hal"

compound shown in column B, the product shown in column C is obtained.

TABLE III

| Ex. No. | n | R | Y | X | R₁ | (Ex. No.) | X' \| C—Z | R Y X R₁ n |
|---|---|---|---|---|---|---|---|---|
| 34. | — | H | —(CH₂)₃— | S | C₆H₅ | 1 | CH₃OCCl (O) | As in Column B / As in Column A |
| 35. | — | H | —(CH₂)₃— | S | p—NO₂—C₆H₄— | 2 | C₆H₅OCBr (O) | |
| 36. | — | H | —(CH₂)₂—CH₃ | O | C₆H₁₃ | 5 | C₂H₅CCl (O) | |
| 37. | 1 | NO₂ (5) | —CH—CH₂— | S | CH₃ | 16 | p—CH₃C₆H₄CBr (O) | |
| 38. | 1 | CH₃ (5) | —CH₂)₂—CH—CH₃ | O | C₆H₅C (O) | 17 | C₂H₅OCCl (O) | |
| 39. | 1 | C₆H₅CNH (7) (O) | —CH₂— | O | /S\ (thiirane) | 18 | CH₃—C₆H₄—OCBr (O) | |
| 40. | 1 | (CH₃)₂N | —(CH₂)₃— | S | C₂H₅ | 19 | C₅H₁₁C—Cl (O) | |
| 41. | 1 | (C₂H₅)₂NCH₂ | —(CH₂)₃— | S | C₄H₉ | 20 | CH₃CCl (O) | |
| 42. | 1 | CH₃OC (5) (O) | —(CH₂)₂— | O | C₆H₅ | 21 | C₂H₅OCCl (O) | |
| 43. | 1 | —NHCOOCH₃ (5) | —CH₂— | S | CH₃ | 22 | CH₃CCl (O) | |

We claim:
1. A compound of the formula:

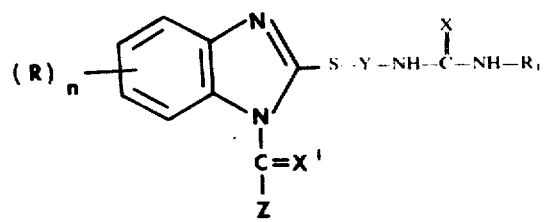

wherein R is selected from the group consisting of hydrogen, lower alkyl, lower alkoxy, lower alkylthio, phenyl, substituted phenyl wherein said substituent is halogen, nitro, or lower alkyl, benzyl, benzoyl, lower alkylcarbonyl, phenoxycarbonyl, phenylcarbonyl, lower alkoxycarbonyl, trifluoromethyl, nitro, halogen, cyano, thiocyano, lower alkylcarbonylamido, lower alkoxycarbonylamido, phenylcarbonylamido, phenoxycarbonylamido, lower alkylamino, and di-lower alkylamino; n is an integer selected from 0, 1 or 2; R₁ is selected from the group consisting of lower alkyl, cycloalkyl of 3 to 7 carbons, phenyl, substituted phenyl wherein said substituent is nitro, halogen, or lower alkyl, lower alkylcarbonyl, and benzoyl; Z is selected from the group consisting of lower alkyl, loweralkoxy, phenyl, phenoxy, substituted phenyl and phenoxy wherein said substituent is halogen, nitro, or lower alkyl, lower alkylamino, cycloalkylamino of 3 to 7 carbons, anilino, benzylamino, substituted anilino wherein said substituent is halogen, nitro, or lower alkoxy, lower alkylcarbonylamido, and phenylcarbonylamido; Y is straight chain alkylene of 1 to 6 carbons which may or may not be substituted by one or two alkyl groups of from 1 to 4 carbons; X is selected from the group consisting of oxygen and sulfur; and X' is oxygen when Z is lower alkyl, lower alkoxy, phenyl, phenoxy, substituted phenyl, or substituted phenoxy and X' is selected from the group consisting of oxygen and sulfur when Z is lower alkylamino, cycloalkylamino of 3 to 7 carbons, anilino, benzylamino, substituted anilino, lower alkylcarbonylamido, or phenylcarbonylamido.

2. A compound of the formula:

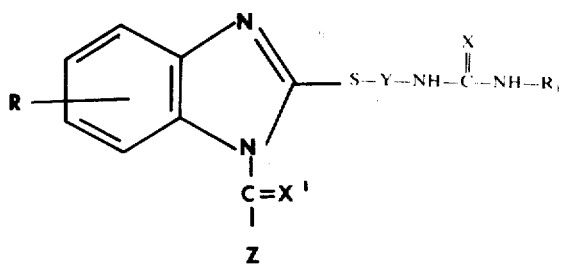

wherein R is selected from the group consisting of hydrogen, lower alkyl, lower alkoxy, lower alkylthio, trifluoromethyl, nitro, halogen, lower alkylamino, and di-lower alkylamino; $R_1$ is selected from the group consisting of lower alkyl, cycloalkyl of 3 to 7 carbons, phenyl, and substituted phenyl wherein said substituent is selected from halogen, nitro and lower alkyl; Z is selected from the group consisting of lower alkoxy, phenoxy, substituted phenoxy wherein said substituent is selected from halogen, nitro, and lower alkyl, lower alkylamino, cycloalkylamino of 3 to 7 carbons, anilino and substituted anilino wherein said substituent is selected from halogen, nitro and lower allkyl; Y is straight chain alkylene group of from 1 to 6 carbons which may or may not be substituted by one or two alkyl groups of from 1 to 4 carbons, X is selected from the group consisting of oxygen and sulfur; and X' is oxygen when Z is lower alkoxy, phenoxy, or substituted phenoxy and X' is selected from the group consisting of oxygen and sulfur when Z is lower alkylamino, cycloalkylamino of 3 to 7 carbons, anilino, or substituted anilino.

3. The compound of claim 2 wherein Z is selected from the group consisting of lower alkylamino, cycloalkylamino of 3 to 7 carbons, anilino, and substituted anilino wherein said substituent is selected from the group consisting of halogen, lower alkyl, and nitro.

4. The compound of claim 3 wherein R is selected from the group consisting of hydrogen and nitro; $R_1$ is selected from the group consisting of phenyl, p-nitrophenyl and cyclohexyl; and Y is $-(CH_2)_3-$.

5. The compound of claim 4 wherein X and X' are both sulfur.

6. The compound of claim 4 wherein X is sulfur and X' is oxygen.

7. The compound of claim 4 wherein X is oxygen and X' is sulfur.

8. The compound of claim 4 wherein X and X' are both oxygen.

9. The compound of claim 8 wherein Z is cyclohexylamino.

10. The compound of claim 9 having the name 1-cyclohexyl-3-[3-[[1-(cyclohexylcarbamoyl)-5-nitro-2-benzimidazolyl]thio]propyl]urea.

* * * * *

UNITED STATES PATENT OFFICE
CERTIFICATE OF CORRECTION

PATENT NO. : 3,901,909
DATED : Aug. 26, 1975
INVENTOR(S) : V. L. Narayanan et al.

It is certified that error appears in the above-identified patent and that said Letters Patent are hereby corrected as shown below:

Col. 2, line 35, "crontonic" should read --crotonic--.

Table A, each line under the headings should be numbered -- 1 through 21.

Table A, line 2, under the heading "$R_1$", should read -- $p\text{-}NO_2\text{-}C_6H_4\text{-}$ --.

Table A, line 5, under the heading "R(position)", should read
-- $5\text{-}C_4H_9$
$6\text{-}C_4H_9$ --.

Table A, line 6, under the heading "Z", should read -- $p\text{-}CH_3\text{-}C_6H_4NH$ --.

Table A, line 6, under the heading "$R_1$", should read

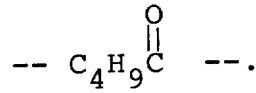

Table A, line 8, under the heading "Z", should read --$C_4H_9$--.

Table A, line 13, under the heading "Z", should read --$p\text{-}Cl\text{-}C_6H_4\text{-}NH$--.

Table A, line 16, under the heading "Y", should read -- $-(CH_2)_4-$ --.

Table A, line 17, under the heading "$R_1$", should read --$C_4H_9$--.

Col. 6, line 15, should read $--(R_4\text{-}NH\text{-}\overset{\overset{X}{\|}}{C}\text{-})--$.

Col. 6, formula VII, should read

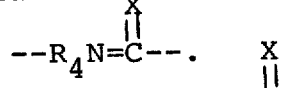

Col. 6, line 40, should read $--R_4NH\overset{\overset{X}{\|}}{C}\text{-}$ --.

UNITED STATES PATENT OFFICE
CERTIFICATE OF CORRECTION

PATENT NO. : 3,901,909
DATED : Aug. 26, 1975
INVENTOR(S) : V. L. Narayanan et al.

It is certified that error appears in the above-identified patent and that said Letters Patent are hereby corrected as shown below:

Col. 6, line 55, should read $-- R_4NH\overset{\overset{O}{\|}}{C} --$.

Col. 7, line 1, should read $--R_4NH\overset{\overset{X}{\|}}{C}- --$.

Table B, line 7, under the heading "R(position)", should read $--(C_4H_9)_2N- (4) --$.

Table B, line 12, under the heading "R(position)", should read $-- (C_4H_9) (5) --$.

Table B, line 19, under the heading "R(position)", should read $-- CH_3-C_6H_4- (4) --$.

Table B, line 22, under the heading "R(position)", should read $-- -NHCOOC_6H_5 (6) --$.

Col. 9, line 12, should read $-- C_4H_9N\overset{\overset{S}{\|}}{C} --$.

Col. 9, line 18, should read $-- CH_3C_6H_4N\overset{\overset{S}{\|}}{C} --$.

Col. 9, line 41, should read $-- CH_3C_6H_4O\overset{\overset{O}{\|}}{C}Br --$.

Col. 10, line 58, the "c" should be deleted, and the "B" should begin a new paragraph.

Col. 11, line 30, "N,N, 13.40" should read --N, 13.40--.

Table I, examples 5 through 12, a period rather than "3" should follow each example no.

Table I, example 6, col. A, under the heading "Y", should read $-- -(CH_2)_4- --$.

Table I, example 8, col. D, under the heading "$R_1$", should read $--C_4H_9\overset{\overset{O}{\|}}{C}--$.

UNITED STATES PATENT OFFICE
CERTIFICATE OF CORRECTION

PATENT NO. : 3,901,909
DATED : Aug. 26, 1975
INVENTOR(S) : V. L. Narayanan et al.

It is certified that error appears in the above-identified patent and that said Letters Patent are hereby corrected as shown below:

Table I, example 10, col. A, under the heading "Y", should read

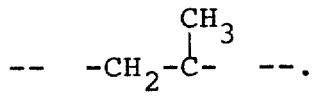

Table I, example 10, col. D, under the heading "$R_1$", should read -- p-$NO_2$-$C_6H_4$- --.

Table I, example 15, col. B, under the heading "R(position)", should read

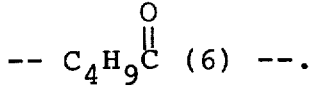

Table I, example 16, col. A, under the heading "Y", should read

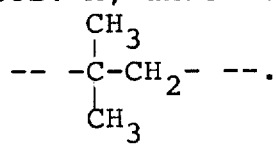

Table I, example 20, col. D, under the heading "$R_1$", should read --$C_4H_9$--.

Table II, example 23, col. B, should read

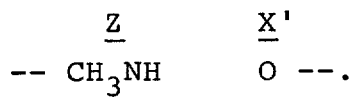

Table II, example 24, col. A, under the heading "$R_1$", should read -- p-$NO_2$-$C_6H_4$- --.

Table II, example 28, col. B, under the heading "Z", should read

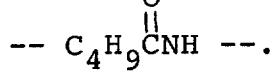

UNITED STATES PATENT AND TRADEMARK OFFICE
CERTIFICATE OF CORRECTION

Page 4 of 4

PATENT NO. : 3,901,909
DATED : Aug. 26, 1975
INVENTOR(S) : V. L. Narayanan et al.

It is certified that error appears in the above-identified patent and that said Letters Patent are hereby corrected as shown below:

Table II, example 28, col. C, under the heading "$\overset{X'}{\underset{\|}{C}}-Z$", should read
$$-- C_4H_9\overset{O}{\underset{\|}{C}}NH\overset{S}{\underset{\|}{C}}- --.$$

Table II, example 30, col. A, under the heading "$R_1$", should read -- $C_4H_9$ --.

Table II, example 30, col. B, under the heading "Z", should read -- $p-NO_2-C_6H_4NH$ --.

Table II, example 30, col. C, under the heading "$\overset{X'}{\underset{\|}{C}}-Z$", should read
$$-- p-NO_2C_6H_4-NH\overset{S}{\underset{\|}{C}}- -- .$$

Table III, example 35, col. A, under the heading "$R_1$", should read -- $p-NO_2C_6H_4-$ --.

Table III, example 37, col. B, should read
$$-- p-CH_3C_6H_4\overset{O}{\underset{\|}{C}}Br --.$$

Table III, example 38, col. A, under the heading "R", should read -- $CH_3$ (5) --.

Table III, example 41, col. A, under the heading "$R_1$", should read -- $C_4H_9$ --.

Table III, example 42, col. B, should read -- $C_4H_9O\overset{O}{\underset{\|}{C}}Cl$ --.

Col. 18, line 51, "loweralkoxy" should read --lower alkoxy--.
Col. 19, line 25, "allkyl" should read --alkyl--.

Signed and Sealed this sixth Day of April 1976

[SEAL]

Attest:

RUTH C. MASON
*Attesting Officer*

C. MARSHALL DANN
*Commissioner of Patents and Trademarks*